Jan. 6, 1970   E. KOTTHAUS   3,487,592
METHOD FOR REGRINDING CUTTING TOOLS
Filed Oct. 12, 1966   2 Sheets-Sheet 1
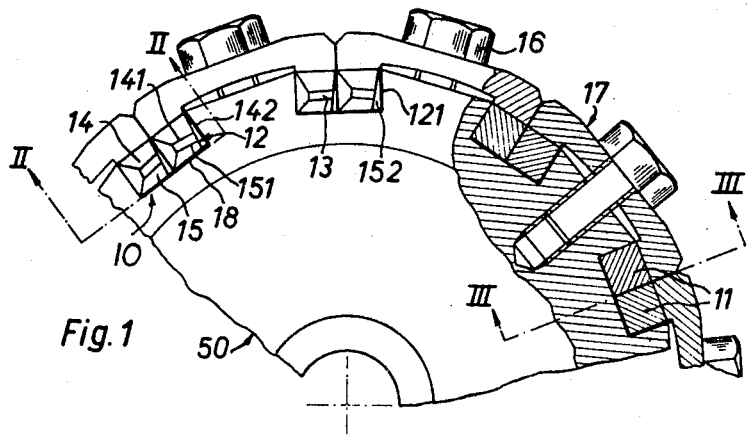
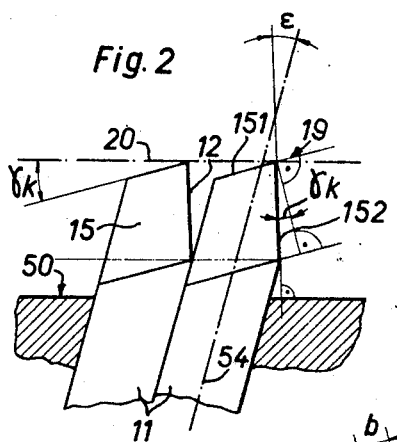
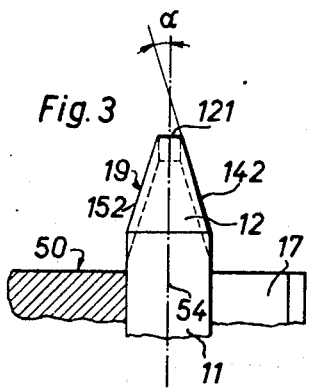
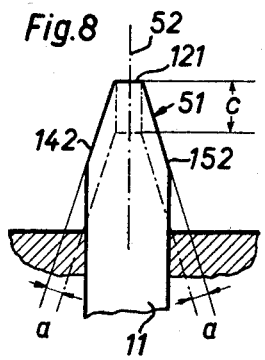
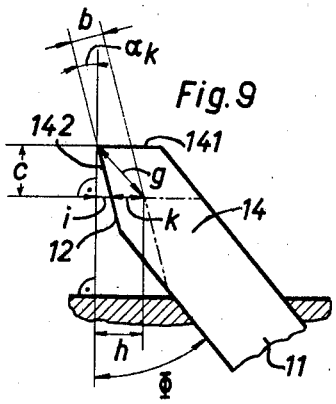
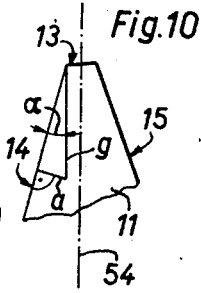

Jan. 6, 1970  E. KOTTHAUS  3,487,592
METHOD FOR REGRINDING CUTTING TOOLS
Filed Oct. 12, 1966  2 Sheets-Sheet 2
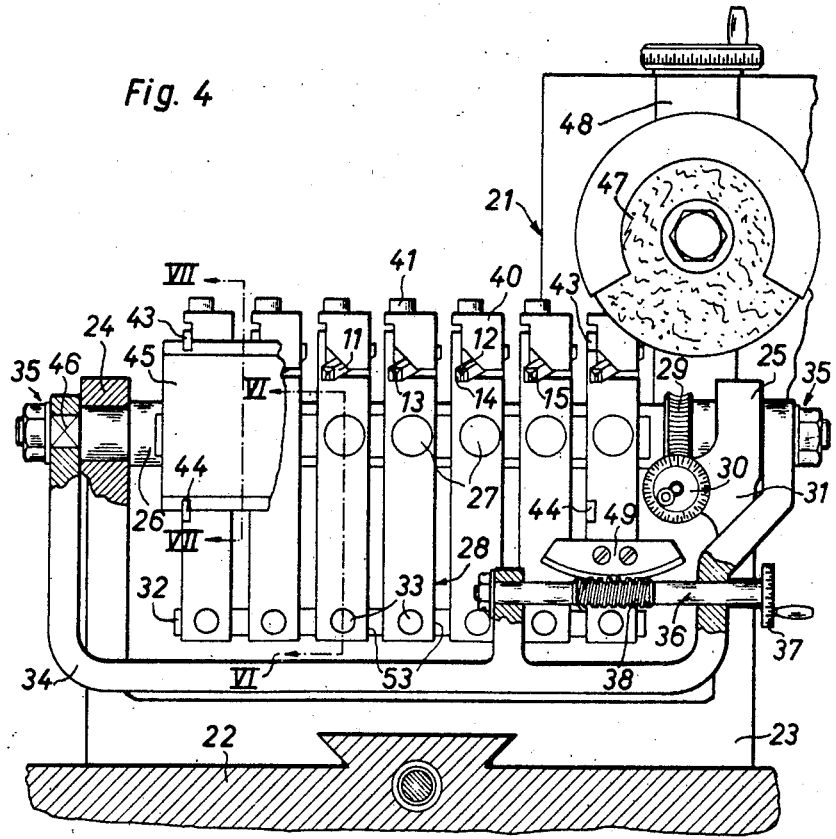
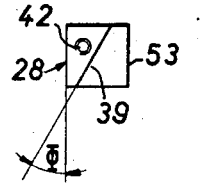
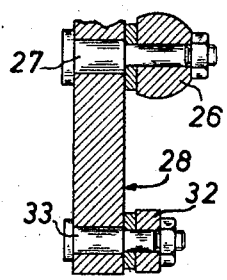
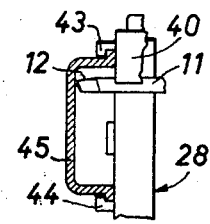
Erich Kotthaus, Inventor

United States Patent Office 3,487,592
Patented Jan. 6, 1970

1

3,487,592
METHOD FOR REGRINDING CUTTING TOOLS
Erich Kotthaus, Kloten, Switzerland, assignor to Oerlikon-Buhrle Holding Ltd., Zurich, Switzerland
Filed Oct. 12, 1966, Ser. No. 586,122
Claims priority, application Switzerland, Oct. 13, 1965, 14,153/65
Int. Cl. B24b *1/00, 19/00*
U.S. Cl. 51—288          2 Claims

ABSTRACT OF THE DISCLOSURE

A method for regrinding a blade or cutting tool. The front cutting face is inclined to the shank of the tool and there is a set of relieved faces including two side faces inclined to the shank. There is a further top cutting face and each of the relieved faces intersect the front cutting face with each intersection line forming part of a cutting edge. The regrinding involves regrinding the front cutting face and the relieved faces by interdependent amounts thereby conserving the shape of the cutting edge and providing displacement of the cutting edge along the shank.

---

The present invention relates to a method for regrinding cutting tools. More particularly the invention relates to the regrinding of blades of face-mill gear cutters provided with supporting shanks.

A primary object of the present invention is to regrind the faces of a blade to such an extent, that the shape of the cutting edge of the blade remains unaltered and that the cutting edge is displaced along the shank of the blade.

Other objects of the invention will be apparent hereinafter from the detailed description.

FIGURE 1 shows part of a cutter head partially in a plan view and partially in section.

FIGURE 2 shows a section through the cutter head on the line II—II in FIGURE 1.

FIGURE 3 shows a section through the cutter head on the line III—III in FIGURE 1.

FIGURE 4 is a diagrammatic view (partially in section) of the machine for securing the cutting tools while the grinding process is being carried out.

FIGURE 5 is a plan view of a tool holder with the head member removed.

FIGURE 6 is a section on the line VI—VI in FIGURE 4.

FIGURE 7 is a partial view on the section line VII—VII in FIGURE 4.

FIGURE 8 is a view of the cutting tool (in the grinding device) looking towards the tool face.

FIGURE 9 is a side view of the cutting tool (in the grinding device).

FIGURE 10 is a section through the cutting tool at right angles to the top face and to the relieved side faces.

As can be seen from FIGURES 1, 2 and 3, cutting tools or blades 10 having a shank 11 of polygonal cross-section are fitted to a cutter head 50. The shanks 11 are secured to the cutter head in receiving slots 18 extending in tangential planes, inclined in relation to the axis of the cutter head, by means of clips 17 which are tightened by screws 16.

The shank 11 of the blade terminates in a configuration 19 of surfaces, one end which forms the cutting edge 51.

2

In other words, this means that the cutting edge 51 is formed by the intersections of the front cutting face 12 and the relieved faces 13, 14 and 15. The front cutting face 12 is the face of the blade over which the chip runs. The relieved top face 13 is at right angles to a plane of symmetry 52—52 containing the shank axis of the cutter, so that both relieved side faces are at the same angle $\alpha=20°$ in relation to the plane 52. The lines of intersection between the top face 13 and the side faces extend parallel to one another and the top clearance angle $\gamma$, that is to say the angle between the machined work surface and the relieved top face amounts to 15°. The angle between the front cutting face 12 and the shank axis 54 of the blade is $\alpha=20°$ and coincides in the example with the shank inclination of the blade with respect to the axis of the cutter head 50.

The lines of intersection between the top face 13 and the front cutting face 12 and the side faces 14 and 15 respectively are designated by 121, 141 and 151. The lines of intersection between the front cutting face 12 and the side faces 14 and 15 are designated by 142 and 152 (FIGURE 1). In order to change the blades on the cutter head 50, the screws 16 are undone, as a result of which the blades can be removed from their receiving slots 18. Freshly ground blades are then introduced into the receiving slots 18 as far as a stop illustrated diagrammatically by the chain line 20 (FIGURE 2). The blades are brought into their final position by this means and do not need any additional adjustment on the cutter head. The securing of the blades is effected by tightening the screws 16.

As FIGURE 4 shows, the grinding machine 21 comprises a longitudinal slide 22 on which a cross slide 23 is movably mounted. The cross slide 23 is provided with two arms 24 and 25 in which is mounted a shaft 26. At equal distances apart, the shaft 26 comprises transverse bores in which are held pins 27 (FIGURE 6), which serve as pivots for holders 28. The shaft 26 is provided with teeth 29 in which there engages a worm wheel driven by a hand wheel 30. The hand wheel is mounted on a flange 31 of the arm 25. The transmission ratio between the worm wheel and the teeth 29 is, for example, selected in such a manner that, from an initial position in which the holders 28 are vertical, one rotation of the hand wheel 30 causes a rotation of the shaft 26 through 1°.

A cross member 32 likewise comprises bores at equal distances apart, in which are secured pins 33. These pins serve as further pivots for the holders 28. A transverse portion 34 is placed on a square 46 on the shaft 26 and rigidly connected to the shaft 26 by screw connections 35 (FIGURE 4). A spindle 36 driven by a hand wheel 37 is mounted in the transverse portion 34 and engages with its worm 38 in a toothed segment 49 rigidly connected to the holder 28 situated furthest towards the right. From the intial position in which the holders 28 are in the vertical position, one revolution of the hand wheel 37 causes a pivoting of the holders 28 about the pins 27 by 1 degree.

At the upper end of each holder 28 there is provided a guide slot 39 (FIGURES 4 and 5) in which a blade to be ground is secured by means of a head member 40 which comprises a screw 41 which is screwed into a threaded bore 42 in the holder 28. The inclination of the guide 39 in relation to the face 53 of the holder 28, that is to say the inclination of the shank 11 of the blade in the grinding device is designated by $\phi$ and amounts to $$\phi = \epsilon + \gamma = 35°.$$

As in FIGURES 4 and 7, guide hooks 43 and 44 are provided on the first and on the last holder 28. A stop member 45 can be slid into these when the holders 28 are in the position shown in FIGURE 4. A rotating cylindrical grinding wheel 47 is mounted in guides 48 for movement upwards and downwards on the housing of the grinding machine 21.

The amounts ground away from the cutting tool to carry out the method are designated by $a$, $b$ and $c$ (FIGURES 8, 9).

As FIGURES 9 and 10 show, the displacement of a point on the top face 13 in the direction of the shank axis during its regrinding is designated by $g$ and a length equal to the orthogonal projection of $g$ on the top face is designated by $h$; $k$ is equal to the displacement of a point on the top face 13 in a plane parallel to the top face during its regrinding. The length $i$ is given by $h = i + k$.

In order to carry out the method, namely in order to regrind the cutting tools in such a manner that the cutting edge 142, 121, 152, formed by the configuration of the planes is displaced along the shank axis into the position shown in chain lines in FIGURES 8 and 9, the blades to be ground are inserted in the guide slots 39 in the holders 28 which are in the initial position in such a manner that the top faces 13 are parallel to the faces 53 of the holders 28. These blades are then displaced until their cutting edges strike against the stop member 45 and are secured by means of the screws 41 through the head members 40. After removal of the stop member 45, the top faces 13 are brought into a position in which they are parallel to the direction of displacement of the slides 22 and 23 as well as the generatrices of the grinding wheel 47, in that the hand wheel 30 is turned 90 tices starting from the initial position, as a result of which the shaft 26 is pivoted through 90° about its axis. The slides 22 and 33 are now displaced in horizontal planes and the grinding wheel 47 in a vertical plane in a known manner which is therefore not illustrated, so that a thickness of $c = 0.3$ mm. for example is removed from the blades by the rotating grinding wheel.

After this regrinding of the top faces, the holders 28 are again brought into the initial position by turning back the hand wheel 30 and the screws 41 are undone. After the blades have been turned by 90° about their shank axis by hand, they assume the position shown in FIGURE 4 and are again pressed against the stop member 45 which has been re-fitted. In this position, the blades are finally secured again by means of the screws 41 and the stop member 45 is removed again. The hand wheel 30 is turned through 15 revolutions which correspond to a rotation of the shaft 26 by an angle of $\gamma = 15°$ about its axis, and the front cutting faces come into a position parallel with the directions of the displacement of the slides 22 and 23. A thickness $b$ of material is now ground away from the front cutting face 12, the value of which is obtained by the formula (FIGURE 9): $b = k \cdot \cos \gamma_k$. Since $k = h - i$, in which $h = c \cdot \tan \phi$ and $i = c \cdot \tan \gamma_k$, $b = 0.125$ mm. is obtained by the insertion in the first equation: $b = c \cdot (\tan \phi - \tan \gamma_k) \cdot \cos \gamma_k$ or $$\beta = c \cdot \frac{\sin \epsilon}{\cos (\epsilon + \gamma)}$$

and through the corresponding insertion of the numerical values of the individual components.

After the regrinding of the front cutting faces, the holders 28 are again brought into the initial position by turning back the hand wheel 30 and the screws 41 are undone. After the blades have been turned through 90° in clockwise direction about their shank axis by hand, the blades are again pressed against the stop member 45 which has been re-fitted. The blades are secured in this position by means of the screws 41 and the stop member 45 is removed again. The hand wheel 30 is turned through 16⅓ revolutions, which corresponds to a pivoting of the shaft 26 through an angle of 20° about its axis, and the relieved side faces 14 come into a position which is parallel to the directions of displacement of the slides 22 and 23. Now the amount $a$ is ground away which, according to FIGURES 8 and 10, results from the formula $a = c \cdot \sin \alpha$. By inserting the numerical values, $a = 0.103$ mm. is obtained.

The relieved side faces 15 are now ground in the same manner with the same amount removed $a = 0.103$ mm., but in the initial position, the blades must be brought into a position turned through 180° about their shank axis in relation to the setting for the regrinding of the side faces 14.

For further regrinding of the blades, the operations described are repeated in precisely the same manner, as a result of which the blades become shorter by the same length.

When large numbers of blades are being reground, it is advisable, after the machine has been adjusted for the regrinding of one face, to divide the whole series into sets of blades as illustrated in FIGURE 4 and to allow these to run through the machine before this is readjusted for the grinding of a further face because the downtimes are reduced as a result.

It may further be advisable to prepare tables in which the amounts to be ground away, obtained by the usual trigonometric calculations, are entered as a function of the angles of the faces forming the cutting edge of the cutting tools. In consequence, the method can be carried out in a simple manner in that the values to be set at the grinding machine only have to be read off from the tables.

The method can, of course, also be carried out if the edges 151 and 141 finally intersect in contrast to the example described, which means that in this case larger clearance angles are obtained than with the normal relieved blades in which, as is generally known, only the front cutting face is reground. In order to bring the faces into the grinding position in this case, however, it is necessary to operate the hand wheel 37 (FIGURE 4). The hand wheel 37 must also be operated when the blade is so formed that it can no longer be secured in the holder 28 in such a manner that a front cutting face is perpendicular to the face 53.

What I claim is:

1. The method of regrinding a blade for the cutting of gear wheels, said blade being provided with a shank, a front cutting face inclined to said shank and a set of relieved faces, said set including two side faces, each of the latter being inclined to said shank, and further including a top cutting face, each of the faces of said set intersecting by an intersection line with said front cutting face, each intersection line forming part of a cutting edge, which comprises regrinding said front cutting face and said set of relieved faces by interdependent amounts to conserve the shape of said cutting edge and to provide a displacement of the cutting edge along said shank.

2. The method of regrinding a blade for the cutting of gear wheels, said blade being provided with a shank, the latter extending along a plane of symmetry and further extending along an axis lying in said plane, said blade further being provided with a front cutting face extending at right angles to said plane of symmetry and being inclined to said axis by an angle $\epsilon$, and said blade being provided with a set of relieved faces, said set including a top cutting face extending at right angles to said plane of symmetry and being inclined to a normal on said top cutting face by an angle $\gamma$, said set further including two side faces extending on opposite sides of said plane of symmetry and being inclined to the latter by an angle $\alpha$, each of the faces of said set intersecting by an intersection line with said front cutting face and each intersection line forming part of a cutting edge, which comprises grinding off from said front cutting face a layer of thickness $b$, from said top face a layer of thickness $c$ and of each of said side faces a layer of thickness $a$, said thicknesses $a$, $b$ and $c$ being related to said angles $\alpha$, $\epsilon$ and $\gamma$ by the relation.

$$c:a:b=1;\ \sin \alpha : \frac{\sin \epsilon}{\cos (\epsilon + \gamma)}$$

to conserve the shape of said cutting edge and to provide a displacement of the cutting edge along said axis.

References Cited
UNITED STATES PATENTS

| | | | |
|---|---|---|---|
| 1,908,155 | 5/1933 | Jorgensen | 51—220 |
| 2,057,303 | 10/1936 | Gstyr | 51—288 |
| 2,218,786 | 10/1940 | Candee et al. | 51—288 X |
| 2,317,996 | 5/1943 | Landy | 51—220 |
| 2,367,494 | 1/1945 | Gebel | 51—220 |
| 2,385,902 | 10/1945 | Wilson | 51—220 |

LESTER M. SWINGLE, Primary Examiner

U.S. Cl. X.R.

51—220